United States Patent
Aymes et al.

(10) Patent No.: US 11,472,578 B2
(45) Date of Patent: Oct. 18, 2022

(54) METHOD AND SYSTEM FOR ESTIMATING THE DIRECTION OF A SATELLITE IN THE TRANSFER PHASE FROM AN INITIAL ORBIT TO A MISSION ORBIT

(71) Applicant: AIRBUS DEFENCE AND SPACE SAS, Toulouse (FR)

(72) Inventors: Jean-Marc Aymes, Toulouse (FR); Sébastien Mazuel, Toulouse (FR); Antoine Poulet, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 864 days.

(21) Appl. No.: 16/320,925

(22) PCT Filed: Jul. 27, 2017

(86) PCT No.: PCT/FR2017/052112
§ 371 (c)(1),
(2) Date: Jan. 25, 2019

(87) PCT Pub. No.: WO2018/020171
PCT Pub. Date: Feb. 1, 2018

(65) Prior Publication Data
US 2019/0217974 A1 Jul. 18, 2019

(30) Foreign Application Priority Data

Jul. 27, 2016 (FR) ..................................... 16 57209

(51) Int. Cl.
*B64G 3/00* (2006.01)
*G01S 3/04* (2006.01)
(Continued)

(52) U.S. Cl.
CPC ............... *B64G 3/00* (2013.01); *B64G 1/007* (2013.01); *G01S 3/043* (2013.01); *G01S 3/40* (2013.01); *H04B 7/18513* (2013.01)

(58) Field of Classification Search
CPC ........... B64G 1/007; B64G 3/00; G01S 3/043; G01S 3/40; H04B 7/18513
See application file for complete search history.

(56) References Cited

U.S. PATENT DOCUMENTS

| | | | | |
|---|---|---|---|---|
| 3,706,096 A | * | 12/1972 | Hammack | G01S 13/46 342/107 |
| 4,667,203 A | * | 5/1987 | Counselman, III | G01C 15/00 342/357.26 |
| 4,809,005 A | * | 2/1989 | Counselman, III | G01C 15/00 342/352 |

(Continued)

FOREIGN PATENT DOCUMENTS

| | | |
|---|---|---|
| EP | 0 460 866 A2 | 12/1991 |
| GB | 2 159 335 A | 11/1985 |

OTHER PUBLICATIONS

Subramanian et al., "Precise Orbit Determination During Transfer Orbit Phase of GSAT-1," J. Spacecraft and Rockets, Sep. 1, 2004, pp. 821-830, vol. 41, No. 5, American Institute of Aeronautics and Astronautics, VA, US. Van Der Horst et al., "Step Track Unit for Antenna Control," Technische Mitteilungen Krupp, Sep. 1, 1987, pp. 79-88, No. 2.

*Primary Examiner* — Hunter B Lonsberry
*Assistant Examiner* — Daniel L Greene
(74) *Attorney, Agent, or Firm* — Im IP Law; Chai Im; C. Andrew Im

(57) ABSTRACT

A method for estimating a direction of a satellite in the transfer phase. The direction of the satellite is estimated relative to a measurement antenna by executing steps for measuring the reception power, by the measurement
(Continued)

antenna, of a target signal emitted by the satellite, for different pointing directions of the measurement antenna. The target signal has a substantially sinusoidal component referred to as a single-frequency component. Each power measurement step includes a transposition in the frequency domain of a digital signal, obtained from a signal supplied by the measurement antenna, to obtain a frequency spectrum of the digital signal over a predetermined frequency band having the single-frequency component. The power measurement for the pointing direction being considered is determined based on a maximum value of the frequency spectrum.

21 Claims, 3 Drawing Sheets

(51) Int. Cl.
*G01S 3/40* (2006.01)
*B64G 1/00* (2006.01)
*H04B 7/185* (2006.01)

(56) References Cited

U.S. PATENT DOCUMENTS

| | | | | |
|---|---|---|---|---|
| 5,515,056 | A | * | 5/1996 | Henderson .............. G01S 13/82 |
| | | | | 342/458 |
| 6,237,876 | B1 | * | 5/2001 | Barker ................... B64G 1/007 |
| | | | | 244/164 |
| 6,317,093 | B1 | | 11/2001 | Harris |
| 6,469,657 | B1 | | 10/2002 | Fox |
| 2002/0089449 | A1 | | 7/2002 | Fox |
| 2004/0041730 | A1 | * | 3/2004 | Fowell .................. H01Q 3/005 |
| | | | | 342/359 |
| 2006/0292990 | A1 | * | 12/2006 | Karabinis .......... H04B 7/18513 |
| | | | | 455/63.4 |
| 2013/0057434 | A1 | * | 3/2013 | Krasner .................... G01S 1/24 |
| | | | | 342/387 |
| 2015/0369924 | A1 | * | 12/2015 | Hedgecock ............. G01S 19/51 |
| | | | | 342/357.34 |
| 2016/0131737 | A1 | * | 5/2016 | Aymes .................. G01S 5/0294 |
| | | | | 342/357.2 |
| 2016/0156408 | A1 | * | 6/2016 | Arcidiacono ........ H04B 17/102 |
| | | | | 455/12.1 |
| 2019/0068282 | A1 | * | 2/2019 | Neuman ............ H04B 7/18515 |

* cited by examiner

METHOD AND SYSTEM FOR ESTIMATING THE DIRECTION OF A SATELLITE IN THE TRANSFER PHASE FROM AN INITIAL ORBIT TO A MISSION ORBIT

RELATED APPLICATIONS

This application is a § 371 application from PCT/FR2017/052112 filed Jul. 27, 2017, which claims priority from French Patent Application No. 16 57209 filed Jul. 27, 2016, each of which is herein incorporated by reference in its entirety.

TECHNICAL FIELD

This invention relates to the field of observing satellites in an Earth orbit. This invention relates more particularly to a system and a method for estimating a direction of a satellite in the transfer phase from an Earth orbit, referred to as "initial orbit", to another Earth orbit, referred to as "mission orbit". This estimation aims for example to restore the orbit of the satellite during the transfer phase.

This invention has a particularly advantageous application, although non-limiting, for the monitoring of the positioning of satellites in geostationary orbit (GEO) from a geostationary transfer orbit (GTO), in particular when the positioning is carried out by electrical means of propulsion of the satellite or by a carrier vehicle that provides the transport of said satellite from the GTO orbit to the GEO orbit.

BACKGROUND OF THE INVENTION

Telemetry, tracking, and command (TT&C) stations are generally implemented for monitoring the transfer phase of a satellite from a GTO orbit, whereon said satellite was injected by a launcher, to a GEO orbit.

Such TT&C stations comprise a highly directional antenna so as to ensure a level of reception that is sufficient in order to decode a telemetry signal emitted by the satellite during the transfer phase, and mobile so as to follow the displacement of said satellite during the transfer phase. The estimated direction corresponds to the pointing direction of the antenna which makes it possible to maximize the reception power measurement of the telemetry signal.

Using TT&C stations is very expensive, such that the duration of the rental of a TT&C station must preferably be as reduced as possible.

However, in the case of a positioning in GEO orbit by means of electrical propulsion, the transfer time lasts between about 3 months (in the case of a positioning by mixed electrical/chemical means of propulsion) and about 6 months (in the case of a positioning by exclusively electrical means of propulsion).

The costs of renting TT&C stations over such durations (3 to 6 months) are prohibitive. Furthermore, although the positioning in GEO orbit using electrical means of propulsion continues to be developed, the current networks of TT&C stations will quickly be exceeded by demand.

An alternative would consist in using the TT&C stations only occasionally to monitor the transfer phase of the satellite. In such a case, the planned trajectory of said satellite would be used to estimate the direction of the satellite at the moment a TT&C station is used, in order to direct the antenna of said TT&C station in the planned direction.

However, if the satellite is not in the planned direction, for example due to a failure of the electrical propulsion means, said satellite would be lost and could possibly be found only by performing a scanning of space by means of one or several TT&C stations. Due to the highly directional nature of the antenna of a TT&C station, such a scanning would however be long and expensive.

In order to overcome these disadvantages, it could be considered to use systems equipped with antennas that are less directive than those of conventional TT&C stations. However, the telemetry signal emitted by the satellite would then be received with a power level far below the noise floor. Furthermore, as the antennas used are less directive, such systems would be more sensitive to the presence of interference having arrival directions close to that of the telemetry signal of said satellite being considered.

OBJECT AND SUMMARY OF THE INVENTION

This invention has for objective to remedy all or a portion of the limitations of the solutions of prior art, in particular those disclosed hereinabove, by proposing a solution that makes it possible to estimate the direction of a satellite in the transfer phase with antennas that are less directive than those of conventional TT&C stations.

To this effect, and according to a first aspect, the invention relates to a method for estimating a direction of a satellite during a transfer phase of said satellite from an Earth orbit, referred to as "initial orbit", to another Earth orbit, referred to as "mission orbit", said direction of said satellite being estimated relative to a measurement antenna by executing a plurality of steps for measuring the reception power, by said measurement antenna, of a target signal emitted by said satellite, for different pointing directions of said measurement antenna, the estimated direction of said satellite corresponding to a pointing direction making it possible to maximize the power measurement. According to the invention, as the target signal comprises a substantially sinusoidal component, referred to as "single-frequency component", each power measurement step comprises a transposition in the frequency domain of a digital signal, obtained from a signal supplied by the measurement antenna, in such a way as to obtain a frequency spectrum of said digital signal over a predetermined frequency band comprising the single-frequency component, referred to as "measurement band", and the power measurement for the pointing direction being considered is determined based on a maximum value of the frequency spectrum.

Thus, the direction of the satellite is estimated by maximizing the reception power measurement of a target signal emitted by the satellite, for example the telemetry signal of said satellite. However, the power measurement is taken in the frequency domain, which has several advantages.

On the one hand, the acquisition of the digital signal over a rather substantial period of time, then the processing thereof in the frequency domain reverts to carrying out several correlations of said digital signal with sinusoidal signals that correspond to the various discrete frequencies being considered in the frequency domain. Such arrangements introduce a gain in processing that is more substantial than in conventional TT&C stations, in particular over the single-frequency component of the target signal, which is substantially sinusoidal. This more substantial gain in processing makes it possible, in the case of the use of antennas that are less directive than those of conventional TT&C stations, to significantly improve the signal-to-noise ratio of a target signal that would have, at the output of the measurement antenna, a power less much less than the noise floor.

On the other hand, the transposition in the frequency domain makes it possible to suppress the interferences that, although having arrival directions close to that of the target signal emitted by the satellite, are split in frequencies of said target signal. It is sufficient indeed to consider a measurement band comprising at least the frequency of the single-frequency component of the target signal but not the frequencies of said interferences. By concentrating more particularly on the single-frequency component, which is substantially sinusoidal, it is possible to have a substantial frequency selectivity, and therefore to be particularly robust with respect to interferences.

In particular embodiments, the method can further comprise one or several of the following characteristics, taken separately or according to all of the technically permissible combinations.

In particular embodiments, the width of the measurement band being considered during a step of power measurement can have several different values.

Such arrangements make it possible, in particular, to progressively improve the frequency selectivity with regards to interferences.

Indeed, several parameters can influence in different degrees of magnitude the frequency of the single-frequency component of the target signal. On the one hand, the latter is generated with means of frequency synthesis that introduce, at emission, a frequency spread of a low magnitude (typically a few hertz) meaning that the frequency of said single-frequency component is not strictly equal to a theoretical frequency desired for the emission of said single-frequency component.

Furthermore, the frequency over which the single-frequency component of the target signal is received is generally different from the frequency whereon said single-frequency component was emitted, due to a Doppler shift introduced by the displacement of the satellite with respect to the measurement antenna and which is of a more substantial magnitude (typically a few hundred kilohertz).

Consequently, before having detecting the satellite, the uncertainty on the frequency of the target signal is potentially substantial, and it is therefore preferable to use a measurement band that is wide enough to ensure that the frequency of said single-frequency component is within said measurement band being considered. Once the single-frequency component detected, it is possible to consider a measurement band that is narrower, re-centered on the frequency of said single-frequency component, so as to improve the suppression of any interference received at the same time as the single-frequency component.

In particular embodiments, the measurement band being considered during a step of power measurement is centered on a frequency of the single-frequency component estimated according to the estimated frequency of said single-frequency component during a preceding step for measuring the power and a theoretical trajectory of the satellite.

In particular embodiments, the width of the measurement band being considered during a step of power measurement is determined according to the time elapsed since the preceding step for measuring the power.

Such arrangements make it possible to improve the frequency selectivity, and therefore the suppression of interferences. Indeed, the uncertainty on the frequency of the single-frequency component increases with the time elapsed between two power measurements. Consequently, the taking account of the time elapsed between two power measurements makes it possible to best adjust the width of the measurement band being considered, which can be chosen as low as possible which still ensuring that it includes the frequency of the single-frequency component.

In particular embodiments, the digital signal is obtained over a predefined frequency band, referred to as "acquisition band", and each measurement band being considered is a frequency sub-band of said acquisition band.

In particular embodiments, the measurement band being considered during a step of power measurement is centered over an estimated frequency of said single-frequency component.

In particular embodiments, the method for estimating the direction of the satellite comprises:
  an estimation of a Doppler shift affecting a theoretical frequency of said single-frequency component in the pointing direction being considered, according to a theoretical trajectory of the satellite,
  an estimation of the frequency of said single-frequency component according to the theoretical frequency of said single-frequency component and of the estimated Doppler shift.

In particular embodiments, the estimation of the Doppler shift is carried out by pre-compensation of the digital signal over a set of hypotheses of values of the frequency variation slope, in order to determine therefrom the most realistic hypothesis. This step takes place before any frequency analysis of the signal. The extent of the hypotheses (in number, in value and in spacing between each hypothesis) of pre-compensation is linked to the expected kinematics of the satellite.

This pre-compensation makes it possible, for the most realistic hypothesis tested, to reduce the frequency spread of the target signal and thus favor the detection thereof and to improve the quality of the power measurement taken on the latter. Thus, the field of use of the invention can be extended to a vaster kinematic range of the satellite. Mention can be made for example of situations where the link budget of the ground-air transmission is unfavorable (low signal-to-noise ratio) and even inaccessible without this device for pre-processing. This pre-compensation also would make it possible to follow satellites that are on lower orbits (in LEO orbit for example).

In particular embodiments, the method for estimating the direction of the satellite comprises an estimation of the frequency of the single-frequency component according to the frequency spectrum of the digital signal.

In particular embodiments, said single-frequency component being affected by a frequency spread of a maximum width $\delta F$ around a theoretical frequency of said single-frequency component, the digital signal before transposition in the frequency domain is of a duration $\Delta T$ such that:

$$\frac{1}{2 \cdot \delta F} \leq \Delta T \leq \frac{1}{\delta F}$$

Such arrangements make it possible to ensure that the single-frequency component will mainly be concentrated, in the frequency domain, over a single discrete frequency (frequency "bin"), which makes it possible to improve the detection of said single-frequency component, as well as its signal-to-noise ratio.

In particular embodiments, the method for estimating the direction of the satellite comprises a search phase and a confirmation phase:
  the search phase comprises a step of measuring the reception power for a pointing direction inside a first predetermined scanning cone around a theoretical direction of the satellite, and a step of evaluating a predetermined detection criterion according to the power measurement obtained for the pointing direction being considered, said steps of measuring the power and of evaluating being repeated for another pointing direction inside the first scanning cone as long as the detection criterion is not verified,
  the confirmation phase, executed when the detection criterion is verified for a power measurement obtained for a pointing direction, referred to as "detection direction", comprises several power measurement steps executed for different respective pointing directions inside a second scanning cone around the detection direction, the estimated direction of the satellite corresponding to the pointing direction making it possible to maximize the power measurement during said confirmation phase.

Such arrangements are advantageous in that they make it possible to rapidly detect the satellite while still having a precise estimation of the direction of the satellite.

Indeed, in the case of a measurement antenna that is hardly directive (with respect to the antennas of conventional TT&C stations), it is not necessarily known, when the target signal is detected, if the latter was received by the main lobe of the radiation diagram of the measurement antenna, or by a secondary lobe of said radiation diagram.

To this effect, the estimation of the direction of the satellite is broken down into at least two phases. The search phase aims to rapidly detect the target signal, and ends as soon as said target signal is detected. However, it is not possible to know, at the end of the search phase, if the target signal was received in the main lobe or in a secondary lobe of the radiation diagram of the measurement antenna. The confirmation phase then aims to maximize, around the detection direction, the reception power measurement of the target signal, and the maximum of the power measurement is necessarily obtained when the target signal is received by the main lobe of the radiation diagram of the measurement antenna.

In particular embodiments, the method for estimating the direction of the satellite comprises, after the confirmation phase, a phase of updating the estimated direction of the satellite, comprising a plurality of power measurement steps associated respectively with different pointing directions around the estimated direction obtained during the confirmation phase, and a step of updating said estimated direction according to said power measurements and according to a predetermined model of the radiation diagram of the measurement antenna.

In particular embodiments, the phase of updating is repeated over time, the power measurements taken during a phase of updating being taken for pointing directions around the estimated direction obtained during the preceding phase of updating.

In particular embodiments, the measurement band being considered during a step of power measurement of the confirmation phase is of a width different from that of the measurement band being considered during a step of power measurement of the phase of updating.

In particular embodiments, during the search phase, the different pointing directions being considered inside the first scanning cone are predefined pointing directions distributed along a spiral centered on the theoretical direction of said satellite, said pointing directions being considered being scanned successively by following said spiral from said theoretical direction of said satellite.

In particular embodiments, during the confirmation phase, the different pointing directions being considered inside the second scanning cone are predefined pointing directions distributed along a spiral centered on the detection direction of said satellite, said pointing directions being considered being scanned successively by following said spiral from said detection direction of said satellite.

In particular embodiments:
  during the search phase, the theoretical direction of the satellite is updated between two successive steps of power measurement, according to a theoretical trajectory of said satellite, and/or
  during the confirmation phase, the detection direction of the satellite is updated between two successive steps of power measurement, according to a theoretical trajectory of said satellite.

In particular embodiments, the first scanning cone and the second scanning cone are of respective angular widths greater than the angular width of a main lobe of a radiation diagram of the measurement antenna.

In particular embodiments, the method uses a target signal emitted by the satellite simultaneously identically according to two polarizations, preferably orthogonal. A polarization is chosen by default to receive the target signal of the satellite. According to a predefined criterion, the method provides to be able to change the polarization and to use the target signal emitted according to the other polarization. For example, the predefined criterion can be considered as verified following a variation in the level of power being considered as significant, such as 5 dB for example. Such arrangements make it possible to guarantee the reception of the target signal of the satellite regardless of the attitude of the latter in relation to the measurement antenna.

According to a second aspect, this invention relates to a computer program product comprising a set of program code instructions that, when they are executed by a processor, configure said processor in order to implement a method for estimating the direction of a satellite according to any one of the embodiments of the invention.

According to a third aspect, this invention relates to a system for estimating a direction of a satellite during a transfer phase of said satellite from an Earth orbit, referred to as "initial orbit", to another Earth orbit, referred to as "mission orbit", said system comprising:
  a measurement antenna of a reception power of a target signal emitted by the satellite,
  means for pointing suitable for modifying a pointing direction of said measurement antenna,
  a device for processing suitable for controlling said pointing means and for measuring a reception power, by the measurement antenna, of a target signal emitted by the satellite, said device for processing being configured to estimate the direction of said satellite by maximizing the reception power measurement of said target signal, Furthermore, as the target signal comprises a substantially sinusoidal component, referred to as "single-frequency component", the device for processing is configured to carry out a transposition in the frequency domain of a digital signal, obtained from a signal supplied by the measurement antenna, in such a way as to obtain a frequency spectrum of said digital signal over a predetermined frequency band comprising the single-frequency component, referred to as "measurement band", and to determine the power measurement for the pointing direction being considered based on a maximum value of said frequency spectrum over said measurement band being considered.

In particular embodiments, the system can further comprise one or several of the following characteristics, taken separately or according to all of the technically permissible combinations.

In particular embodiments, the device for processing is configured to vary the width of the measurement band being considered, used for the power measurement, during the estimation of the direction of the satellite.

In particular embodiments, the device for processing is configured to consider, during a power measurement, a measurement band centered over a frequency of the single-frequency component estimated according to the estimated frequency of said single-frequency component during a preceding measurement of power and a theoretical trajectory of the satellite.

In particular embodiments, the width of the measurement band being considered for a power measurement is determined according to the time elapsed since the preceding measurement of power.

In particular embodiments, the means for pointing are motorized mechanical means suitable for modifying the orientation of the measurement antenna.

In particular embodiments, the measurement antenna comprises a source and a reflector.

In particular embodiments, the measurement antenna is a network antenna formed from a plurality of elementary antennas, and the means for pointing comprise a beam forming network.

In particular embodiments, the measurement antenna of the target signal comprises two radiofrequency accesses that make it possible to receive this target signal according to two orthogonal polarizations and to be able to select the polarization that makes it possible to receive the best signal-to-noise ratio. Such arrangements make it possible to guarantee the reception of the satellite signal regardless of the attitude of the latter in relation to the measurement antenna.

BRIEF DESCRIPTION OF THE DRAWINGS

The invention shall be better understood when reading the following description, given by way of an example that is in no way limiting, and given in reference to the figures which show.

In these figures, references that are identical from one figure to another designate identical or similar elements. For reasons of clarity, the elements shown are not to scale, unless mentioned otherwise.

DETAILED DESCRIPTION OF EMBODIMENTS

This invention relates to a system 10 and a method 50 for estimating the direction of a satellite 20 in the transfer phase from an Earth orbit, referred to as "initial orbit", to another Earth orbit, referred to as "mission orbit". In the rest of the description, we shall address in a non-limiting way the case where the mission orbit is the GEO orbit, and wherein the initial orbit is a GTO orbit whereon the satellite 20 is placed by using a means of launching, such as a conventional launcher of the Ariane 5 range.

Conventionally, the positioning in GEO orbit of a satellite 20 from a GTO orbit uses means of propulsion of said satellite 20 and/or means of propulsion of a carrier vehicle that provides the transport of said satellite over a portion at least of the path between the GTO orbit and the GEO orbit.

The invention has a particularly advantageous application in the case of a use of electrical means of propulsion over all or a portion of the path between the GTO orbit and the GEO orbit. Indeed, such as indicated hereinabove, the transfer time is then substantial (3 to 6 months), such that renting TT&C stations during the entire transfer time represents a cost that is too high, and is also an ineffective use of the TT&C stations.

Nothing excludes, however, using the invention to monitor a transfer phase of a satellite using non-electrical means of propulsion, in particular chemical means of propulsion.

Figure 1:
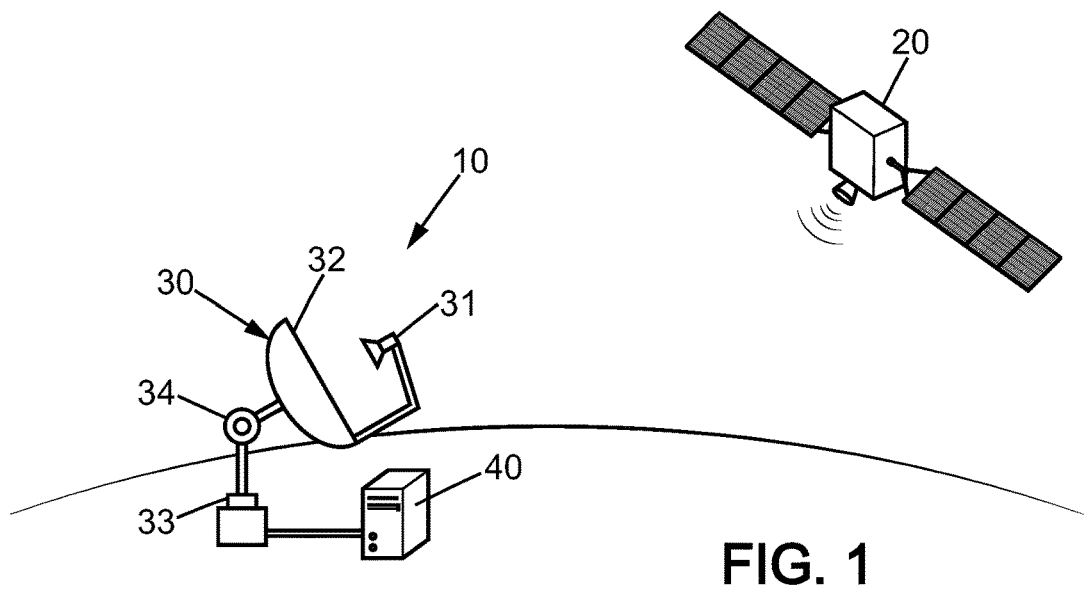
FIG. 1: a diagrammatical representation of an embodiment of a system for estimating the direction of a satellite in the transfer phase.

FIG. 1 diagrammatically shows a non-limiting embodiment of a system 10 for estimating the direction of a satellite 20 in the transfer phase from a GTO orbit to a GEO orbit.

Such as shown in FIG. 1, the system 10 for estimating comprises an Earth measurement antenna 30. The term "Earth" means the surface of the Earth, in particular on the ground itself, at the top of a building, of a pylon, etc. The system 10 for estimating also comprises means for pointing suitable for modifying a pointing direction of the measurement antenna 30.

In the non-limiting example shown in FIG. 1, the measurement antenna 30 is of the type comprising a source 31 and a reflector 32, and the pointing means correspond to motorize mechanical means, for example two motorized articulations 33, 34 suitable for modifying the pointing direction respectively in azimuth and in elevation.

At a given instant, the instantaneous field of view covered by the measurement antenna 30 is mainly determined by the width of the main lobe of the radiation diagram of said measurement antenna 30. The term "main lobe" means the lobe of the radiation diagram of the measurement antenna 30 that comprises the pointing direction, i.e. the direction of radiation for which the maximum gain $G_{MAX}$ of the measurement antenna 30 is obtained. The angular width of the main lobe, in a plane comprising said pointing direction, corresponds to the width of the angular range comprising said pointing direction and the directions of radiation having a gain greater than or equal to ($G_{MAX}$–3 dB). For example, the maximum gain $G_{MAX}$ of the measurement antenna 30 is greater than or equal to 15 dB/K (decibels per Kelvin).

In the case of a measurement antenna 30 comprising a source 31 and a reflector 32, the angular width of the main lobe in particular depends on the dimensions of said reflector 32. In preferred embodiments, the dimensions of said reflector 32 are less than 5 meters, even less than 3 meters, in such a way that the measurement antenna 30 is much less directive than the antennas of conventional TT&C stations, which comprise reflectors of which the dimensions are generally greater than 20 meters.

By varying the pointing direction of the measurement antenna 30, thanks to the motorized articulations 33, 34, it is possible to cover over the course of time a field of view that is much more substantial than the instantaneous field of view of the measurement antenna 30. For example, the motorized articulation 33 makes it possible to vary the pointing direction in azimuth of the measurement antenna 30 in an interval of ±110 degrees around a pointing direction in central azimuth, and the motorized articulation 34 makes it possible to vary the pointing direction in elevation from 10 degrees to 80 degrees in relation to the ground.

The system 10 for estimating also comprises a device 40 for processing, connected to the measurement antenna 30 by a receiving chain (not shown in the figures).

Conventionally, each receiving chain comprises for example at least one low noise amplifier (LNA), a frequency down circuit and an analogue/digital converter. The receiving chain provides a digital signal from a signal obtained at the output of the measurement antenna 30.

The device 40 for processing comprises for example at least one processor and at least one electronic memory wherein a computer program product is memorized, in the form of a set of program code instructions to be executed in order to implement the various steps of a method 50 for estimating the direction of the satellite 20 in the transfer phase. Alternatively, or as a complement, the device 40 for processing comprises one or several programmable logic circuits (FPGA, PLD, etc.), and/or one or several specialized integrated circuits (ASIC), and/or a set of discrete electronic components, etc., suited for implementing all or a portion of said steps of the method 50 for estimating.

In other terms, the device 40 for processing comprises a set of software-configured means (specific computer program product) and/or hardware-configured means (FPGA, PLD, ASIC, discrete electronic components, etc.) in order to implement the steps of the method 50 for estimating the direction of the satellite 20 in the transfer phase.

In particular, a method 50 for estimating the direction of the satellite 20 comprises steps, implemented by the device 40 for processing, of:
- controlling pointing means of the measurement antenna 30, here the motorized articulations 33, 34 in the example shown in FIG. 1, in such a way as to vary the pointing direction of said measurement antenna 30,
- measuring the reception power of a target signal emitted by the satellite 20 according to the digital signal obtained from the signal supplied by the measurement antenna 30.

By varying the pointing direction of the measurement antenna 30 and by measuring, for each pointing direction being considered, the reception power of said target signal, the device 40 for processing estimates the direction of said satellite 20 by maximizing the reception power measurement of said target signal. Thus, the estimated direction of the satellite 20 corresponds to the pointing direction maximizing the reception power measurement of the target signal.

Preferably, the target signal being considered comprises a substantially sinusoidal component, referred to as "single-frequency component". The target signal can be of any suitable type, as long as it comprises such a single-frequency component.

In particular, many current satellites emit, including in the transfer phase, a telemetry signal comprised of a phase modulation/binary phase-shift keying (PM/BPSK), i.e. with a first level of linear phase modulation followed by a digital modulation with two phase states. Such a signal can be expressed in the following form:

$$s_{RF}(t) = A \cdot \sin(2 \pi \cdot F_{RF} \cdot t + m_{TM} \cdot d(t) \cdot \sin(2 \pi \cdot F_{TM} \cdot t))$$

expression wherein:
- $s_{RF}(t)$ corresponds to the telemetry signal as a function of time,
- A corresponds to the amplitude of the telemetry signal,
- $F_{RF}$ corresponds to the carrier frequency of said telemetry signal,
- $m_{TM}$ corresponds to the modulation index,
- d(t) corresponds to the data emitted in the telemetry signal,
- $F_{TM}$ corresponds to the frequency deviation between the carrier frequency $F_{RF}$ and the carrier frequencies modulated by the data d(t).

Figure 2:
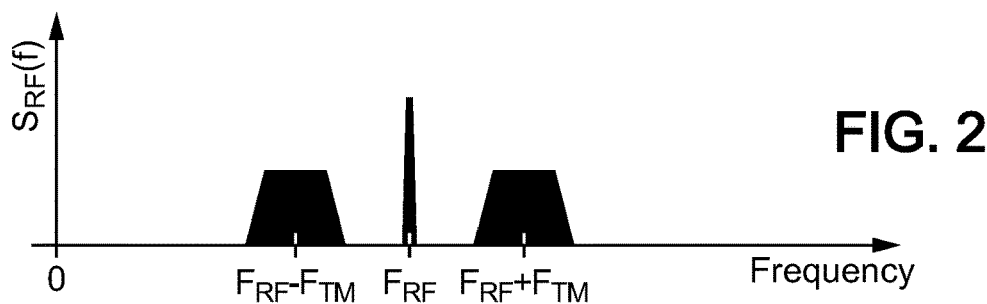
FIG. 2: a diagrammatical representation of a frequency spectrum of a telemetry signal emitted by a satellite.

FIG. 2 diagrammatically shows the main components of the frequency spectrum $S_{RF}(f)$ of the telemetry signal. Such as shown in FIG. 2, the main components of the frequency spectrum $S_{RF}(f)$ of the telemetry signal are as follows:
- a single-frequency component on the frequency $F_{RF}$, generally designated as "residue carrier" in the context of a telemetry signal,
- components that are not single-frequency, centered respectively on the frequencies ($F_{RF}+F_{TM}$) and ($F_{RF}-F_{TM}$).

In the rest of the description, we shall address in a non-limiting way the case where the target signal corresponds to a telemetry signal such as described hereinabove, in such a way that the single-frequency component corresponds to the residue carrier of said telemetry signal. This single-frequency component is in general that which has the best signal-to-noise ratio for modulation indexes of about 1 rad.

Such as indicated hereinabove, the direction of the satellite 20 is estimated by maximizing the reception power measurement of the telemetry signal, in such a way that the estimation of the direction of said satellite 20 comprises a plurality of steps for measuring the power of said telemetry signal for different pointing directions of the measurement antenna 30. Advantageously, the device 40 for processing, for each power measurement:
- performs a transposition in the frequency domain of the digital signal supplied by the receiving chain of the measurement antenna 30, in such a way as to obtain a frequency spectrum of said digital signal over a predetermined frequency band comprising the frequency $F_{RF}$ of the residue carrier, referred to as "measurement band",
- determines the power measurement for the pointing direction being considered based on a maximum value of said frequency spectrum over said measurement band being considered.

Thus, if the digital signal comprises the telemetry signal emitted by the satellite 20 (which will be the case if the measurement antenna 30 is pointed substantially in the direction of the satellite 20), then the maximum value of the frequency spectrum of the digital signal corresponds in principle to the residue carrier of the telemetry signal. Preferably, the power measurement of the telemetry signal corresponds to the reception power measurement only of the residue carrier (i.e. the other components of the telemetry signal are not considered for the power measurement, in such a way that the power measurement consists in measuring the reception power of said residue carrier).

The transposition in the frequency domain can implement any method known to those skilled in the art, for example a fast Fourier transform (FFT). Such a transposition in the frequency domain takes as input several consecutive samples of the digital signal, obtained during a predetermined acquisition time. The longer the acquisition time is, the higher the gain in processing introduced on the residue carrier will be.

However, it is also advantageous to not excessively increase this acquisition time, in order to prevent having an excessive frequency resolution in the frequency domain, i.e. discrete frequencies that are excessively tight. Indeed, this could result in spreading said residue carrier over several discrete frequencies, due to the fact in particular of a frequency spread affecting the residue carrier at the emission due to phase noise. In preferred embodiments, the acquisition time $\Delta T$ of the digital signal is such that:

$$\frac{1}{2 \cdot \delta F} \leq \Delta T \leq \frac{1}{\delta F}$$

expression wherein $\delta F$ corresponds to the maximum width of this frequency spread around the carrier frequency $F_{RF}$. In other terms, $F_{RF}$ being the theoretical emission frequency of the residue carrier, the residue carrier is in reality formed by a main frequency component at the theoretical frequency $F_{RF}$, but also by other frequency components comprised mainly inside a frequency band $[F_{RF}-\delta F/2; F_{RF}+\delta F/2]$. The maximum width $\delta F$ of this frequency spread is defined as corresponding to the width of the frequency band wherein the frequency components have a power greater than or equal to ($P_{MAX}-5$ dB), expression wherein $P_{MAX}$ corresponds to the power of the main frequency component at the theoretical frequency $F_{RF}$. By respecting the expression hereinabove, the residue carrier will mainly be concentrated over a single discrete frequency. Preferably, the same acquisition time $\Delta T$ is used for each power measurement step. For example, if the maximum width $\delta F$ is equal to 1.5 Hertz, then the acquisition time is for example equal to 0.67 seconds.

The local oscillators on board the satellite and on the ground must therefore by dimensioned in order to guarantee suitable short-term stability. In particular, it is important that the ground system have knowledge of the stability of the local oscillators on board the satellite so as to take it into account in order to limit the scattering of the energy of the signal outside of a frequency "bin" ($\delta F$) in the frequency domain.

Such as indicated hereinabove, the measurement antenna 30 is preferably less directive than the antennas used in conventional TT&C stations. For example, the angular width of the main lobe of the radiation diagram of the measurement antenna 30 is greater than 0.5 degree, even greater than 2 degrees, and this regardless of the plane being considered comprising the pointing direction of the measurement antenna 30. Such arrangements make it possible to more easily detect the satellite 20, in that the instantaneous field of view of said measurement antenna 30 is more substantial than for the antennas of conventional TT&C stations. However, due to the fact that the measurement antenna 30 is less directive than the antennas of conventional TT&C stations, the maximum gain $G_{MAX}$ will also be less than that of the antennas of conventional TT&C stations. However, the decrease in the maximum gain is offset by an increase in the acquisition time $\Delta T$. For example, if the acquisition time $\Delta T$ is fixed such as described hereinabove in order to concentrate the residue carrier over a single discrete frequency, then it is possible to choose a maximum gain $G_{MAX}$ for the measurement antenna 30 in order to make it possible, in light of the acquisition time $\Delta T$ selected and of the associated processing gain, to detect the residue carrier of the telemetry signal.

Due to the fact that the measurement antenna 30 is less directive that the antennas of conventional TT&C stations, it is also more sensitive to the presence of interference having arrival directions that are close to that of the telemetry signal emitted by the satellite 20.

However, due to the fact that the power measurement is taken in the frequency domain, and mainly on the residue carrier which occupies a very narrow frequency bandwidth, more preferably concentrated over a single discrete frequency, it is easy to choose a measurement band that is suitable for suppressing the interferences.

In preferred embodiments, the width of the measurement band can have several different values during the estimation of the direction of the satellite 20, for example in order to adjust said width to the uncertainty over the frequency of the residue carrier.

Figure 3A:
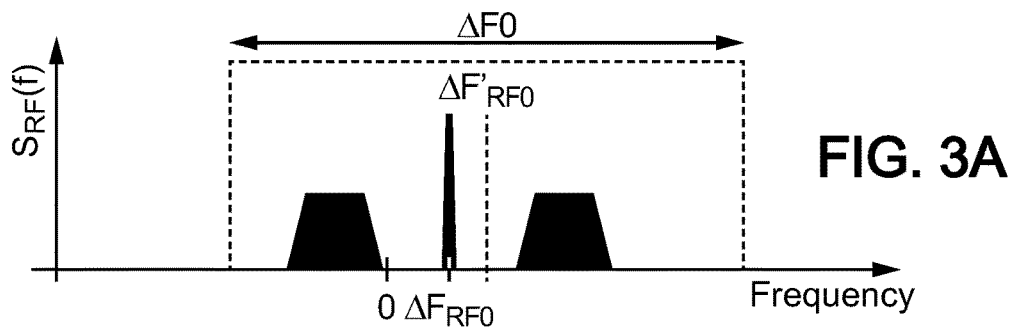
FIG. 3: a diagrammatical representation of frequency spectra of the telemetry signal showing the use of measurement bands of different widths in order to measure the reception power of said telemetry signal.
Figure 3B:
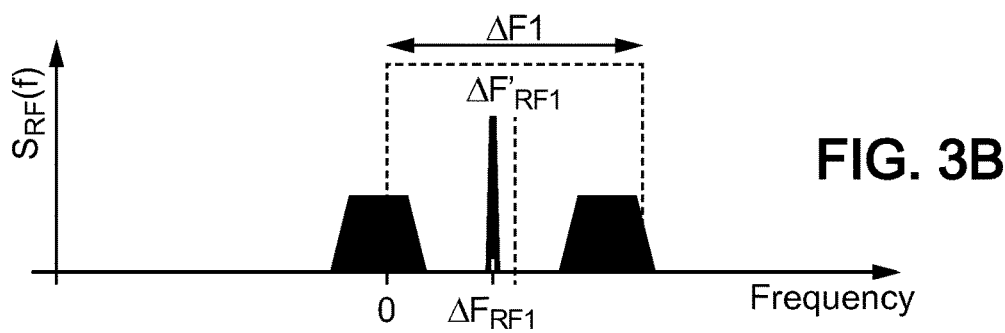

FIG. 3 diagrammatically shows a non-limiting example of the use of various widths for the measurement band used to measure the reception power of the residue carrier of the telemetry signal of the satellite 20.

The frequency down circuit of the receiving chain is for example configured to bring the frequency $F_{RF}$ over an intermediate frequency, which can be zero, by applying a predetermined frequency translation. In the rest of the description, we shall address in a non-limiting way the case where the frequency $F_{RF}$ is brought over a zero frequency (baseband). Consequently, in theory, the residue carrier of the telemetry signal is, in the frequency spectrum of the digital signal, brought over the zero frequency.

Part a) of the FIG. 3 shows the frequency spectrum of the digital signal, obtained during an initial step of measuring the power of the residue carrier. Such as shown in part a) of FIG. 3, the frequency spectrum of the digital signal comprises a telemetry signal. However, due to the fact for example of the frequency drift affecting the telemetry signal at emission and/or due to a Doppler shift introduced after the emission by the displacement of the satellite 20 in relation to the measurement antenna 30, the telemetry signal is received by the measurement antenna 30 over a frequency $F_{RF0}$ that is different from the theoretical frequency $F_{RF}$, equal to $F_{RF} \Delta F_{RF0}$. Thus, the residue carrier is received, in baseband, over the frequency $\Delta F_{RF0}$.

Consequently, in order to ensure the initial detection of the telemetry signal, and more particularly of its residue carrier, it is preferable to consider a substantial width $\Delta F0$ for the measurement band.

The measurement band is for example centered over the theoretical frequency $F_{RF}$ of the residue carrier. In a preferred alternative, the method 50 for estimating the direction of the satellite 20 comprises the estimating of the frequency of the residue carrier, and the measurement band is advantageously centered over said estimated frequency of the residue carrier. The frequency of the residue carrier is for example estimated according to the theoretical frequency $F_{RF}$, known a priori, and the theoretical trajectory of said satellite 20, which makes it possible to estimate the Doppler shift. In the example shown in part a) of FIG. 3, the estimated Doppler shift is equal to $\Delta F'_{RF0}$, in such a way that the estimated frequency of the residue carrier is equal to $F'_{RF0}=F_{RF} \Delta F'_{RF0}$, and is different from the frequency $F_{RF0}$ of the residue carrier, for example due to the frequency drift introduced into the emission.

Such as shown in part a), the measurement band, of width $\Delta F0$ and centered over the estimated frequency $\Delta F_{RF0}$ of the residue carrier, indeed comprises the actual frequency $\Delta F_{RF0}$ of the residue carrier. The frequency spectrum of the digital signal reaches, on said frequency $\Delta F_{RF0}$, a maximum value that makes it possible to detect said residue carrier. The maximum value obtained makes it possible to estimate the power of the residue carrier. Furthermore, the discrete frequency for which the maximum value is obtained gives an estimation of the actual frequency $\Delta F_{RF0}$ of the residue carrier.

Part b) of FIG. 3 shows the frequency spectrum of the digital signal, obtained during a later step of measuring the power of the residue carrier. Such as shown in part b) of FIG. 3, the telemetry signal is received over a frequency $F_{RF1}$ that is different from the theoretical frequency $F_{RF}$, equal to $F_{RF}+F_{RF1}$. Thus, the residue carrier is received, in baseband, over the frequency $\Delta F_{RF1}$.

Preferably, the frequency of the residue carrier is estimated based on the frequency $F_{RF0}$ estimated during the preceding power measurement step, taking account of the theoretical trajectory of the satellite 20. In this way, the impact of the frequency drift at the emission is reduced and the precision of the estimation of the Doppler shift is improved. This results in that the uncertainty over the actual frequency $\Delta F_{RF1}$ of the residue carrier is decreased in relation to the preceding power measurement step, in such a way that the estimation $\Delta F'_{RF1}$ of the actual frequency $\Delta F_{RF1}$ is more precise than during the preceding power measurement step. For this reason, in particular, it can be possible to consider the width $\Delta F1$ of the measurement band less than the width $\Delta F0$ being considered during the preceding power measurement step, thus improving the suppression of any interference.

In preferred embodiments, the width $\Delta F1$ is determined according to the time elapsed since the preceding step of measuring the power, and decreases with the latter (in other terms, the less time has elapsed since the preceding step of measuring the power, the lower the width of the measurement band being considered is). Such arrangements make it possible to adapt the width of the measurement band to the uncertainty over the actual frequency of the residue carrier, since this uncertainty is all the more so low than said elapsed time is low. For example, the width $\Delta F1$ of the measurement band being considered is proportional to the elapsed time, and is for example determined according to the expression $\Delta F1 = K \cdot \delta T$ Hertz, expression wherein $\delta T$ corresponds to the time elapsed between the two power measurement steps being considered and K corresponds to the proportionality coefficient (K is for example equal to 50 Hertz/second).

Such as shown in part b), the measurement band, of width $\Delta F1$ and centered over the estimated frequency $\Delta F'_{RF1}$ of the residue carrier, indeed comprises the actual frequency $\Delta F_{RF1}$ of the residue carrier. The frequency spectrum of the digital signal reaches, on said frequency $\Delta F_{RF1}$, a maximum value that makes it possible to detect said residue carrier. The maximum value obtained makes it possible to estimate the power of the residue carrier. Furthermore, the discrete frequency for which the maximum value is obtained gives an estimation of the actual frequency $\Delta F_{RF1}$ of the residue carrier.

Thus, in particular embodiments, it is possible to modify different parameters of the measurement band being considered from one power measurement step to another, in particular:
 the central frequency of said measurement band,
 the width of said measurement band.

For example, the digital signal is obtained over a predefined frequency band, referred to as "acquisition band", which is invariant over time, and each measurement band being considered is a frequency sub-band of said acquisition band.

Such arrangements make it possible to reduce the complexity of the receiving chain, which does not have to manage the various possible widths for the measurement band and the various possible central frequencies for said measurement band. The width of the acquisition band is chosen, according to the expected maximum excursion for the frequency of the residue carrier (by Doppler shift, due to the frequency drift introduced into the emission, etc.), in such a way as to ensure that the residue carrier is always included within said acquisition band. Preferably, the zero frequency, whereon said acquisition band is centered, corresponds to the theoretical frequency $F_{RF}$ of the residue carrier. For example, the acquisition band is of width 300 kilohertz, and the width $\Delta F0$ of the measurement band being considered during the initial detection is for example equal to 100 kilohertz.

The frequency spread can also be caused by the Doppler effect: if the radial speed of the satellite in relation to the measurement antenna undergoes a significant variation during the acquisition time, i.e. in case of a notable radial acceleration, the frequency of the target signal varies during the measurement. In order to limit the consequences of this phenomenon (reduction in the signal-to-noise ratio in particular), the invention optionally implements, before the spectral analysis phase (itself followed by the detection and power measurement phase), a step of pre-compensation of the digital signal using a set of hypotheses of Doppler slope values. Thus, for the tested value that is the closest to the actual value of the Doppler variation, the spread effect is mostly counterbalanced and its harmful consequences are cancelled.

The performing of this step can be carried out either simultaneously or successively over the different slope hypotheses.

When the step is carried out simultaneously over all of the slope hypotheses, then first of all the digital signal is replicated as many times as hypotheses. Then a different pre-compensation will be applied over each copy of the digital signal. Finally, the most realistic slope hypothesis will be that which maximizes the power of the detected signal.

When the step is carried out successively over all of the slop hypotheses then a pre-compensation corresponding to the slope value to be tested is applied on a temporary copy of the digital signal. Then, the level of the corresponding signal is measured and it is compared with the latest highest level detected for the other hypotheses. If the slope hypothesis in progress is the highest then its index is stored. When all of the slope hypotheses have been tested, it is sufficient to look at the stored index to find the most realistic hypothesis.

In order to be more precise on the estimation of the real value of the slope, it is also possible to consider varying the values of the hypotheses during this step of pre-compensation or to run the step of pre-compensation several times with values that are increasingly tight around the actual slop value. Indeed, when a power peak is detected, it can be assumed that the actual value of the slope is located around this range.

Figure 4:
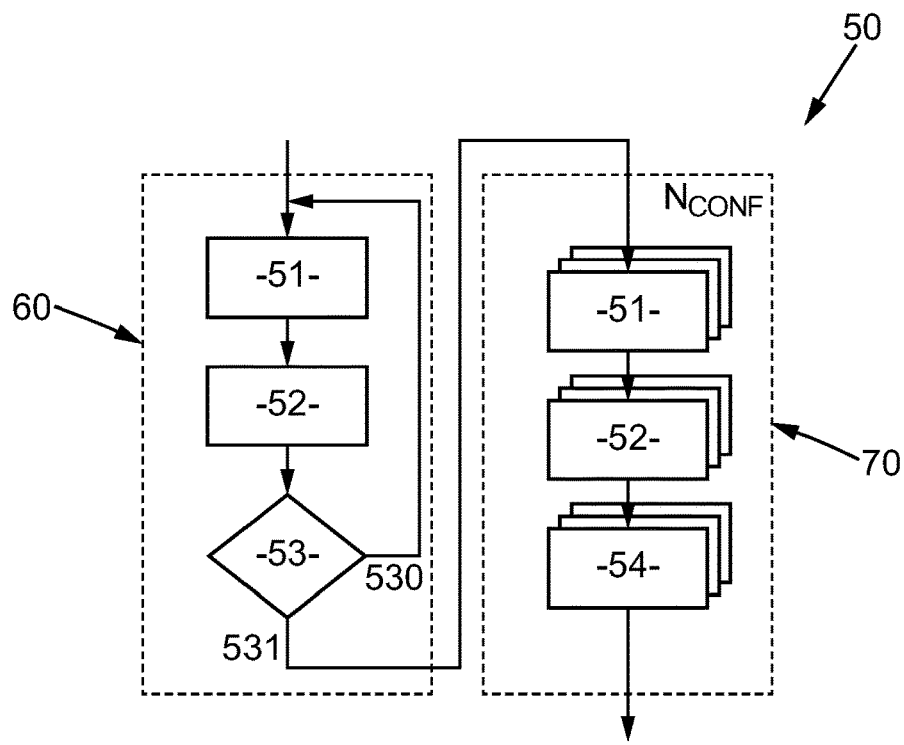
FIG. 4: a diagram showing the main phases of a preferred embodiment of the method for estimating the direction of the satellite in the transfer phase.

FIG. 4 shows the main phases of a preferred embodiment of the method 50 for estimating the direction of the satellite 20.

Such as shown in FIG. 4, the method 50 for estimating the direction of the satellite 20 comprises, in the embodiment being considered, a search phase 60 and a confirmation phase 70.

The search phase 60 comprises a step 51 for controlling, by the device 40 for processing, of the pointing means of the measurement antenna 30 in order to direct the measurement antenna 30 in a pointing direction inside a first predetermined scanning cone around a theoretical direction of the satellite 20, and a step 52 of measuring the power for the pointing direction being considered. The theoretical direction of the satellite is for example obtained, conventionally, from the expected theoretical trajectory of said satellite 20.

The search phase 60 also comprises a step 53 of evaluating a predetermined detection criterion according to the power measurement obtained for the pointing direction being considered. For example, the detection criterion is verified when the power measurement is greater than a predetermined threshold value.

As long as the detection criterion is not verified (reference 530 in FIG. 4), said steps 51 of controlling the pointing means, 52 of measuring the power and 53 of evaluating are repeated for another pointing direction inside the first scanning cone.

As soon as the detection criterion is verified (reference 531 in FIG. 4), the search phase 60 stops. The pointing direction for which the power measurement has made it possible to verify the detection criterion is designated hereinafter by "detection direction".

The first scanning cone, comprising the pointing directions, around the theoretical direction of the satellite 20, which are able to be considered during the search phase 60, is more preferably of an angular width (respectively in azimuth and in elevation) that is greater than the angular width (respectively in azimuth and in elevation) of the main lobe of radiation of the measurement antenna 30. Thus, the telemetry signal of the satellite 20 can be detected even if the theoretical direction of said satellite 20 is not very precise.

In preferred embodiments, during the search phase 60, the different pointing directions being considered inside the first scanning cone are predefined pointing directions distributed along a spiral centered on the theoretical direction of said satellite, said pointing directions being considered being scanned successively by following said spiral from said theoretical direction of said satellite.

Figure 5:
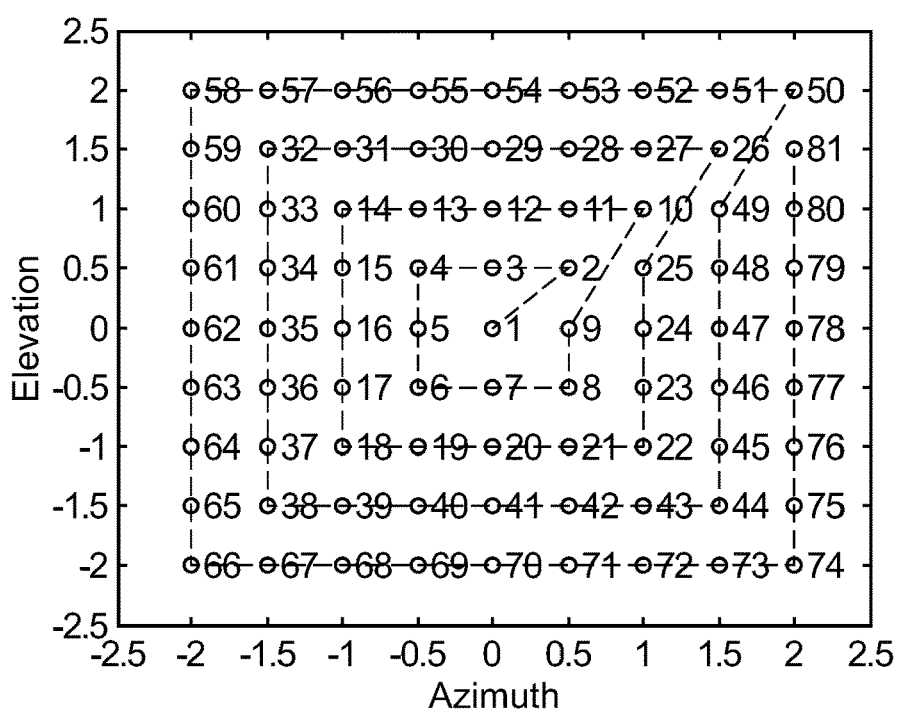
FIG. 5: a diagrammatical representation of an example of a spiral followed for scanning various pointing directions of a measurement antenna of the system for estimating.

FIG. 5 diagrammatically shows a spiral example that can be implemented during the search phase 60.

In the non-limiting example shown in FIG. 5, the spiral is rectangular and comprises 81 possible pointing directions around the theoretical direction of the satellite 20. The possible pointing direction 81 are scanned successively from the pointing direction "1" to the pointing direction "81", by maintaining the first scanning cone centered over the theoretical direction of the satellite 20, i.e. in such a way that the pointing direction "1" is aligned with said theoretical direction of said satellite 20.

In FIG. 5:

the abscissa correspond to the azimuth angle around the theoretical direction of said satellite 20, normalized in such a way that the value "1" corresponds to the angular width in azimuth of the main lobe of the measurement antenna 30, the ordinates correspond to the angle of elevation around said theoretical direction of said satellite 20, normalized in such a way that the value "1" corresponds to the angular width in elevation of the main lobe of the measurement antenna 30.

In the rest of the description, we shall address in a non-limiting way the case where the main lobe of the radiation diagram of the measurement antenna 30 has the same angular width in azimuth and in elevation, and the angular width of said main lobe is designated hereinafter by $\Delta\theta_{3dB}$.

Such as shown in FIG. 5, the angular width of the first scanning cone is for example equal to $4 \cdot \Delta\theta_{3dB}$ (i.e. $\pm 2 \cdot \Delta\theta_{3dB}$), which makes it possible in principle to find the satellite 20 even if the theoretical direction is not very precise. The angular deviation between two successive pointing directions of the spiral is for example equal to $\Delta\theta_{3dB}/2$, which makes it possible to limit the maximum number of pointing directions to be scanned inside the first scanning cone while still ensuring that the satellite 20 can indeed be detected.

Using a spiral has diverse advantages:

makes it possible to have good spatial density of the possible pointing directions inside the first pointing cone and to detect the telemetry signal in a single spiral, makes it possible to have good robustness to the errors on the pointing directions in that we pass several times in the vicinity of the same pointing direction, the scanning from the center of the first scanning cone to the limit of the latter makes it possible in principle to detect the telemetry signal more rapidly when the theoretical direction is not too imprecise.

In the example shown in 5, the spiral being considered is square. Such arrangements are advantageous in that, between two measurement steps, it is possible to modify the pointing direction of the measurement antenna 30 only according to one dimension, azimuth or elevation, if however, the displacement of the satellite 20 between two power measurement steps 52 can be neglected.

However, in preferred embodiments, the theoretical direction of the satellite 20, whereon the first scanning cone is centered (pointing direction "1" aligned with said theoretical direction), is advantageously updated, according to the theoretical trajectory of said satellite 20, in order to take account of the theoretical displacement of said satellite 20 between two power measurement steps 52.

The confirmation phase 70 is executed when the detection criterion is verified during the search phase 60.

The confirmation phase 70 comprises a step 51 of controlling, by the device 40 for processing, of the pointing means of the measurement antenna 30 in order to direct the measurement antenna 30 in a pointing direction inside a second predetermined scanning cone around the pointing direction determined during the search phase 60, and a step 52 of measuring the power for the pointing direction being considered.

Contrary to the search phase 60, the step 51 of controlling and the step 52 of measuring power are, during the confirmation phase 70, executed a predetermined number $N_{CONF}$ of times in such a way as to obtain $N_{CONF}$ power measurements associated respectively with different pointing directions inside the second scanning cone.

The confirmation phase 70 also comprises a step 54 of estimating the direction of the satellite 20 according to the various power measurements obtained, the estimated direction of said satellite 20 corresponding to the pointing direction making it possible to maximize the power measurement during said confirmation phase 70.

The second scanning cone, comprising the pointing directions, around the detection direction of the satellite 20, which are able to be considered during the confirmation phase 70, is more preferably of angular width greater than the angular width of the main lobe of the radiation diagram of the measurement antenna 30. Thus, the telemetry signal of the satellite 20 can be detected even if the detection direction of said satellite 20 is not very precise, and in particular even if the telemetry signal of said satellite 20 was received, during the search phase 60, by the intermediary of a secondary lobe of the measurement antenna 30.

In preferred embodiments, during the confirmation phase 70, the different pointing directions being considered inside the second scanning cone are predefined pointing directions distributed along a spiral centered on the detection direction of said satellite, said pointing directions being considered being scanned successively by following said spiral from said detection direction of said satellite.

Everything that has been described hereinabove, in reference to the spiral able to be implemented during the search phase 60, in particular what was described in reference to FIG. 5, can also be applied for the spiral that can be implemented during the confirmation phase 70, the theoretical direction of the satellite 20 being considered during the confirmation phase 70 corresponding to the detection direction obtained during the search phase 60.

Regarding more particularly the spiral described in reference to FIG. 5, note that the pointing directions 81 are all scanned successively during the confirmation phase 70. As indicated hereinabove, it is also possible, during the confirmation phase 70, to update the detection direction of the satellite 20, according to the theoretical trajectory of said satellite 20, in order to take account of the theoretical displacement of said satellite 20 between two power measurement steps 52.

Note that the spiral being considered during the confirmation phase 70 is not necessarily identical to the spiral considered during the search phase 60.

In particular, it is possible to consider different angular widths for the first scanning cone and the second scanning cone, and/or angular deviations between two different successive pointing directions for the first scanning cone and the second scanning cone and/or different numbers of pointing directions inside the first scanning cone and the second scanning cone.

Figure 6:
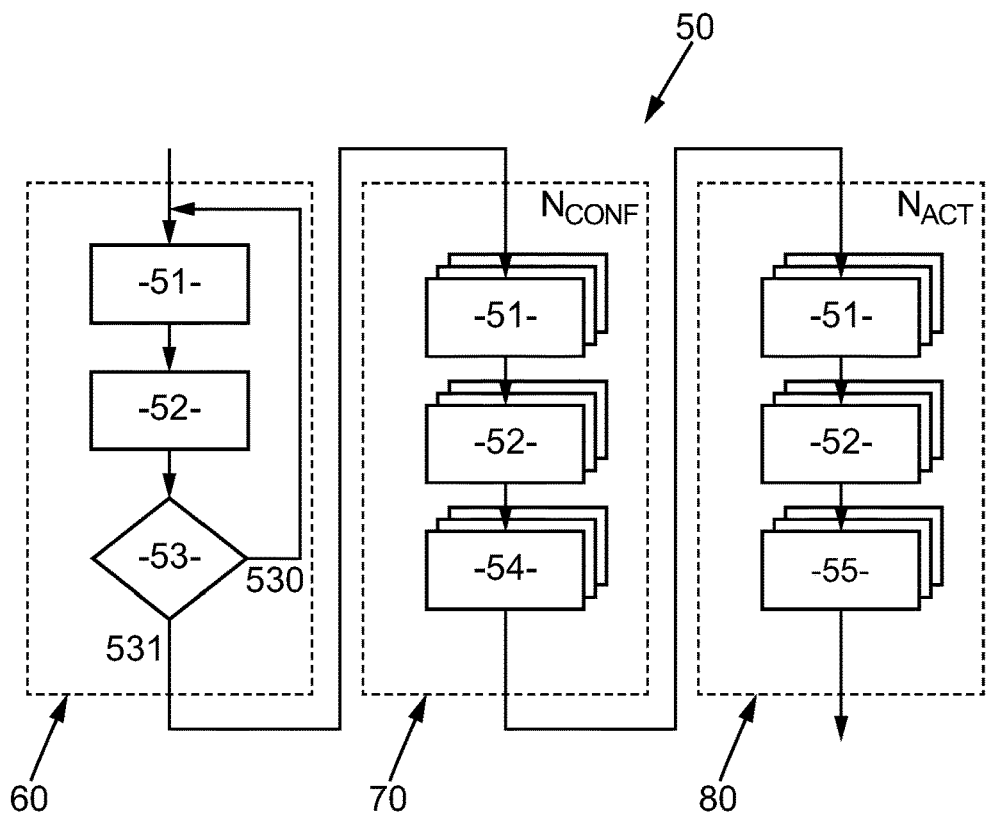
FIG. 6: a diagram showing the main phases of an alternative embodiment of the method for estimating of FIG. 4, FIG. 7: a diagrammatical representation of examples of diagrams of pointing directions of the measurement antenna for updating the estimated direction of the satellite.

FIG. 6 diagrammatically shows an alternative embodiment of the method 50 for estimating of FIG. 4, wherein said method 50 for estimating further comprises a phase 80 of updating the estimated direction of the satellite 20.

The phase 80 of updating comprises a step 51 of controlling, by the device 40 for processing, pointing means of the measurement antenna 30 and a step 52 for measuring power.

The step 51 of controlling and the step 52 for measuring power are, during the phase 80 of updating, executed a predetermined number $N_{ACT}$ of times in such a way as to obtain $N_{ACT}$ power measurements associated respectively with different pointing directions around the estimated direction of the satellite 20 obtained during the confirmation phase 70.

The phase 80 of updating also comprises a step 55 of updating said estimated direction according to said power measurements and according to a predetermined model of the radiation diagram of the measurement antenna 30.

Indeed, the precision of the direction estimated during the confirmation phase 70 is in practice limited by the angular deviation between two adjacent pointing directions. The phase 80 of updating therefore aims to improve the precision of the estimated direction.

To this effect, power measurements are taken for a number $N_{ACT}$ of different pointing directions around the direction estimated during the confirmation phase 70. As the emission power of the telemetry signal and the propagation losses can be considered to be constant over the duration of the phase 80 of updating, the differences between the $N_{ACT}$ power measurements depends substantially:
on the radiation diagram of the measurement antenna 30,
on the $N_{ACT}$ pointing directions being considered,
on the actual direction of the satellite 20.

Thus, the estimated direction of said satellite 20 can be updated as being the most likely direction, for example in terms of least squares, in light of the $N_{ACT}$ pointing directions being considered, of the associated power measurements and of the radiation diagram of the measurement antenna 30, which can probably be obtained for example by calibration.

Figure 7:
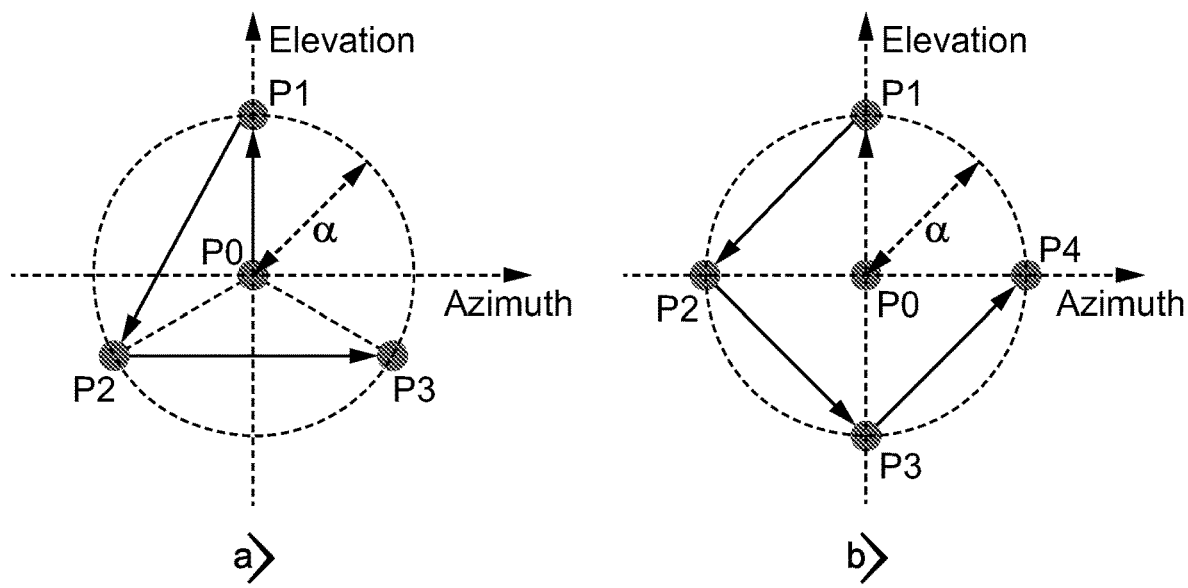

FIG. 7 diagrammatically shows examples of pointing directions that can be considered around the direction estimated during the confirmation phase 70.

More particularly, part a) shows a diagram comprising 4 ($N_{ACT}$=4) pointing directions. In addition to the direction estimated during the confirmation phase 70 (reference P0 on part a) of FIG. 7), the diagram comprises 3 pointing directions P1 to P3 uniformly distributed around the estimated direction P0, spaced from said estimated direction P0 by an angular deviation a which is for example equal to $\Delta\theta_{3dB}/2$.

Part b) of FIG. 7 shows a diagram comprising 5 ($N_{ACT}$=5) pointing directions. In addition to the direction estimated during the confirmation phase 70 (reference P0 on part b) of FIG. 7), the diagram comprises 4 pointing directions P1 to P4 uniformly distributed around the estimated direction P0, spaced from said estimated direction P0 by an angular deviation a which is for example equal to $\Delta\theta_{3dB}/2$.

As indicated hereinabove for the search phase 60 and the confirmation phase 70, it is possible, during the phase 80 of updating, to update the estimated direction P0 of the satellite 20 according to the theoretical trajectory of said satellite 20, in order to take account of the theoretical displacement of said satellite 20 between two power measurement steps 52.

Advantageously, the phase 80 of updating can, in particular embodiments, be repeated over time. Where applicable, the power measurements taken during a phase 80 of updating are taken for pointing directions around the estimated direction obtained during the preceding phase 80 of updating.

In the case where the width of the measurement band can vary during the estimation of the direction of the satellite 20, then it is advantageous, for reasons indicated hereinabove, to consider for example:
during the search phase 60 and the confirmation phase 70: the same width ΔF0 of the measurement band for all of the power measurements,
during the phase 80 of updating: a width ΔF1 that can be less than the width ΔF0 and the same for all of the power measurements, or vary from one power measurement to another, for example according to the time elapsed between said power measurements.

In particular embodiments, the method 50 for estimating comprises a prior step of calibration (not shown in the figures) of the measurement antenna 30.

During this step of calibration, the search phase 60, the confirmation phase 70 and, where applicable, the phase 80 of updating are executed, seeking to estimate the directions of reference satellites of which the actual positions, and therefore the actual directions in relation to the measurement antenna 30, are known a priori. The reference satellites are for example satellites position in GEO orbit.

By comparing the estimated directions of the reference with their actual directions, it is possible to deduce therefore pointing errors of the measurement antenna 30. The pointing errors thus determined can then be used to correct the estimated direction for a satellite 20 in the transfer phase.

More generally, note that the embodiments and realizations considered hereinabove have been described by way of non-limiting examples, and that other alternatives are can consequently be considered.

In particular, the invention was described by considering a measurement antenna 30 of the type comprising a source 31 and a reflector 32, and motorized mechanical pointing means. Nothing excludes however, according to other examples, considering other types of measurement antennas 30 and/or pointing means. For example, it is possible to consider a measurement antenna 30 that has the form of a network antenna formed from a plurality of elementary antennas (horn antennas, patch antennas, etc.), with the means for pointing then comprising a beam forming network. The beam forming network is:
- analogue, in which case a single digital signal, corresponding to the beam formed, is supplied as input of the device 40 for processing, or
- digital, in which case several digital signals are supplied as input of said device 40 for processing, associated respectively with the various elementary antennas, said device 40 for processing forming, from said digital signals, the beams associated with the pointing directions being considered.

Furthermore, the invention was described by considering in particular an estimation of the frequency of the residue carrier in combination with a variable width of the measurement band being considered. However, it is also possible to estimate the frequency of the residue carrier, in order to re-center the measurement band over the estimated frequency, when the width of the measurement band is the same for all of the power measurements. It is also possible to not estimate the frequency of the residue carrier; the measurement band then being centered over the theoretical frequency of said residue carrier.

In addition, the invention was described, in the case where the method 50 for estimating comprises a search phase 60 and a confirmation phase 70, by considering mainly a scanning in spiral inside the first scanning cone and/or the second scanning cone. Nothing excludes however, according to other examples, considering other scanning diagrams of the different pointing directions. In particular, it is possible, according to other examples, to randomly select the pointing direction to be considered before each power measurement, or to use a scanning in an ellipse, etc.

In particular embodiments of the invention, the measurement antenna of the target signal has two radiofrequency accesses that make it possible to receive this target signal according to two orthogonal polarizations. This type of implementation is to be linked to the fact that in order to guarantee the reception of the target signal regardless of the attitude of the latter with respect to the measurement antenna, it is necessary to emit the target signal via two antennas installed in such a way as to be approximately diametrically opposite. Thus, with each one having a semi-hemispherical emission diagram, the total coverage of the two antennas is global. In addition, in order to prevent fading phenomena of the combined signal of the two antennas, each antenna emits the target signal according to a polarization orthogonal to the other. The target signal is therefore received over one of the reception channels or over the other according to the flight phases. In this configuration, the search phases of the position of the satellite and continuation of the latter by evaluation of the maximum power received must therefore take account this polarization duality. Thus, in order to guarantee a pertinent "steptrack" cycle, the power measurements used to determine the new direction to be pointed are all from the same polarization, the latter being determined as being that which gave the best signal-to-noise ratio on the first measurement of the cycle.

In the case where the two polarizations have close levels (case of a satellite with linear polarization received as circular for example), the polarization used can potentially vary frequently. This case being harmful to the performances of the continuation, straight polarization is chosen initially arbitrarily and a hysteresis is implemented in order to decide change in polarization only following a variation in the level considered to be significant, 5 dB for example.

Furthermore, the invention was described by considering the case where the mission orbit is a GEO orbit and wherein the initial orbit is a GTO orbit. The invention is nevertheless applicable to other types of mission orbits and other types of initial orbits, as soon as the satellite is transferred from an initial orbit to a mission orbit, separate from the initial orbit. In particular, the mission orbit can be any type of geosynchronous orbit. The initial orbit can be any type of GTO orbit with or sans inclination, or a super-synchronous orbit, a sub-synchronous orbit, etc.

Furthermore, note that, in its principle, the invention described hereinabove also applies for estimating the direction of a satellite 20 positioned on its mission orbit, in particular for a satellite positioned on a geosynchronous orbit such as a GEO orbit.

Also note that, in its principle, the invention is not limited to a particular frequency band and can for example operate in the frequency bands C, Ku, Ka, etc. Furthermore, in particular embodiments, the invention can operate in several frequency bands, by considering for example a measurement antenna with a reflector and several sources suitable for receiving target signals emitted by different satellites in different respective frequency bands, for example in frequency bands C, Ku and Ka (which correspond to the frequency bands that are generally used for emitting telemetry signals by satellites). The target signals received by these different sources of the measurement antenna are for example all brought over the same intermediate frequency, for example in the L band, in order to be processed according to the invention. Such a configuration makes it possible to reduce the number of elements of the system to be installed such as the number of sites, processing chains and reflectors. Thus, the deployment of the solution according to the invention is faster and less expensive.

The description hereinabove clearly shows that through its different characteristics and the advantages thereof, this invention achieves the objectives that were set for it. In particular, the system 10 for estimating according to the invention makes it possible to estimate at least cost the direction of a satellite 20 in the transfer phase from a GTO orbit to a GEO orbit.

The invention claimed is:

1. A method for estimating a direction of a satellite during a transfer phase of the satellite from an Earth orbit, referred to as an initial orbit, to another Earth orbit, referred to as a mission orbit, comprising:
- a plurality of steps of measuring, by a measurement antenna, a reception power to estimate the direction of the satellite relative to the measurement antenna of a target signal emitted by the satellite, for different pointing directions of the measurement antenna;
- wherein, the target signal comprises a substantially sinusoidal component, referred to as a single-frequency component, each power measurement step comprises a transposition in a frequency domain of a digital signal, obtained from a signal supplied by the measurement antenna, to obtain a frequency spectrum of the digital signal over a predetermined frequency band comprising the single-frequency component, referred to as a measurement band, and a power measurement for a pointing direction being considered is determined based on a maximum value of the frequency spectrum over the measurement band being considered;
- wherein the plurality of steps of measuring the reception power are executed during a search phase, a confirmation phase and an update phase;
- the search phase comprising steps of: measuring the reception power for a pointing direction inside a first predetermined scanning cone around a theoretical direction of the satellite; evaluating a predetermined detection criterion according to the power measurement obtained for the pointing direction being considered; and repeating the steps of measuring the reception power and evaluating the predetermined detection criterion for another pointing direction inside the first scanning cone until the predetermined detection criterion is verified;
- the confirmation phase, executed upon verification of the predetermined detection criterion for the power measurement obtained for a pointing direction, referred to as a detection direction, the confirmation phase comprises steps of measuring the reception power executed for different respective pointing directions inside a second scanning cone around the detection direction, the estimated direction of the satellite corresponding to a pointing direction maximizing the power measurement during the confirmation phase; and
- the updating phase for updating the estimated direction of the satellite, the updating phase comprising steps of: measuring the reception power associated respectively with different pointing directions around the estimated direction obtained during the confirmation phase; and updating the estimated direction according to the reception power measurements and to a predetermined model of a radiation diagram of the measurement antenna.

2. The method according to claim 1, wherein the step of the updating phase is repeated over time, the reception power measurements taken during a current updating phase is used for pointing directions around the estimated direction obtained during a preceding phase of updating.

3. The method according to claim 1, wherein a width of the measurement band being considered during the step of measuring the reception power in the confirmation phase is different from that of the measurement band being considered during the step of measuring the reception power in the updating phase.

4. The method according to claim 1, wherein the different pointing directions being considered inside the first scanning cone during the search phase are predefined pointing directions distributed along a spiral centered on the theoretical direction of the satellite, the pointing directions being considered are scanned successively by following the spiral from the theoretical direction of the satellite.

5. The method according to claim 1, wherein the different pointing directions being considered inside the second scanning cone during the confirmation phase are predefined pointing directions distributed along a spiral centered on the detection direction of the satellite, the pointing directions being considered are scanned successively by following the spiral from the detection direction of the satellite.

6. The method according to claim 1, wherein at least one of the following is performed:
- during the search phase, the theoretical direction of the satellite is updated between two successive steps for measuring reception power, according to a theoretical trajectory of the satellite; and
- during the confirmation phase, the detection direction of the satellite is updated between two successive steps for measuring reception power, according to the theoretical trajectory of the satellite.

7. The method according to claim 1, wherein the first scanning cone and the second scanning cone are of respective angular widths greater than an angular width of a main lobe of a radiation diagram of the measurement antenna.

8. A computer program product recorded on a non-transitory media comprising a set of program code instructions executable by a processor to perform the method for estimating the direction of the satellite according to claim 1.

9. The method according to claim 1, wherein:
- each step of measuring the reception power comprises determining a frequency for which the maximum value of the frequency spectrum is obtained, and
- the measurement band considered during a step of measuring the reception power is centered on a frequency of the single-frequency component which is estimated based on the frequency for which the maximum value of the frequency spectrum has been obtained during a preceding step of measuring the reception power and based on a theoretical trajectory of the satellite.

10. The method according to claim 1, wherein a width of the measurement band considered during a step of measuring the reception power is determined based on a time elapsed since the preceding step of measuring the reception power.

11. The method according to claim 1, wherein the target signal corresponds to a telemetry signal emitted by the satellite and the single frequency component corresponds to a residue carrier of the telemetry signal.

12. A system to estimate a direction of a satellite during a transfer phase of the satellite from an Earth orbit, referred to as an initial orbit, to another Earth orbit, referred to as a mission orbit, the system comprising:
- a measurement antenna to measure a reception power of a target signal emitted by the satellite;
- an articulator to modify a pointing direction of the measurement antenna;
- a processor to control the articulator and to process the reception power measurement of the target signal emitted by the satellite,
- wherein the target signal comprises a substantially sinusoidal component, referred to as a single-frequency component;
- wherein the processor is configured to:
  - perform a transposition in a frequency domain of a digital signal, obtained from a signal supplied by the measurement antenna, to obtain a frequency spectrum of the digital signal over a predetermined frequency band comprising the single-frequency component, referred to as a measurement band;

determine the power measurement for the pointing direction being considered based on a maximum value of the frequency spectrum over the measurement band being considered; and execute a search phase, a confirmation phase and, after the confirmation phase, an update phase to update the estimated direction of the satellite:

the search phase comprises a measurement of the reception power for a pointing direction inside a first predetermined scanning cone around a theoretical direction of the satellite, and an evaluation of a predetermined detection criterion according to the power measurement obtained for the pointing direction being considered, the power measurement and evaluation being repeated for another pointing direction inside the first scanning cone until the predetermined detection criterion is verified;

the confirmation phase, executed when the predetermined detection criterion is verified for the power measurement obtained for a pointing direction, referred to as a detection direction, the confirmation phase comprises several power measurements executed for different respective pointing directions inside a second scanning cone around the detection direction, the estimated direction of the satellite corresponding to a pointing direction maximizing the power measurement during the confirmation phase; and the updating phase comprises a plurality of power measurements associated respectively with different pointing directions around the estimated direction obtained during the confirmation phase and updating the estimated direction according to the power measurements and to a predetermined model of a radiation diagram of the measurement antenna.

13. The system according to claim 12, wherein the updating phase is repeated over time, the reception power measurements taken during a current updating phase is used for pointing directions around the estimated direction obtained during a preceding updating phase.

14. The system according to claim 12, wherein a width of the measurement band being considered during the power measurement of the confirmation phase is different from that of the measurement band being considered during the power measurement of the updating phase.

15. The system according to claim 12, wherein the different pointing directions being considered inside the first scanning cone during the search phase are predefined pointing directions distributed along a spiral centered on the theoretical direction of the satellite, the pointing directions being considered are scanned successively by following the spiral from the theoretical direction of said satellite.

16. The system according to claim 12, wherein the different pointing directions being considered inside the second scanning cone during the confirmation phase are predefined pointing directions distributed along a spiral centered on the detection direction of the satellite, the pointing directions being considered are scanned successively by following the spiral from the detection direction of the satellite.

17. The system according to claim 12, wherein the processor performs at least one of the following:

during the search phase, the theoretical direction of the satellite is updated between two successive power measurements, according to a theoretical trajectory of said satellite; and during the confirmation phase, the detection direction of the satellite is updated between two successive power measurements, according to the theoretical trajectory of said satellite.

18. The system according to claim 12, wherein the first scanning cone and the second scanning cone are of respective angular widths greater than the angular width of a main lobe of a radiation diagram of the measurement antenna.

19. The system according to claim 12 wherein the processor is further configured to determine a frequency for which the maximum value of the frequency spectrum is obtained during each power measurement comprises, and center the measurement band considered during a power measurement on a frequency of the single-frequency component which is estimated based on the frequency for which the maximum value of the frequency spectrum has been obtained during a preceding power measurement and based on a theoretical trajectory of the satellite.

20. The system according to claim 12, wherein the processor is further configured to determine a width of the measurement band considered during a power measurement based on a time elapsed since the preceding power measurement.

21. The system according to claim 12, wherein the target signal corresponds to a telemetry signal emitted by the satellite and the single frequency component corresponds to a residue carrier of the telemetry signal.

* * * * *